United States Patent
Maras et al.

(10) Patent No.: US 11,560,883 B2
(45) Date of Patent: Jan. 24, 2023

(54) ROD CONNECTOR AND METHOD

(71) Applicant: AMERICAN BLOCK, Houston, TX (US)

(72) Inventors: Stephan Maras, Port Moody (CA); Earl Foote, Houston, TX (US); Vladimir Scekic, New Westminster (CA); Sumit Shah, Houston, TX (US); Michael Stankovsky, Houston, TX (US)

(73) Assignee: American Block, Houston, TX (US)

( * ) Notice: Subject to any disclaimer, the term of this patent is extended or adjusted under 35 U.S.C. 154(b) by 506 days.

(21) Appl. No.: 16/603,346

(22) PCT Filed: Apr. 6, 2018

(86) PCT No.: PCT/US2018/026503
§ 371 (c)(1),
(2) Date: Oct. 7, 2019

(87) PCT Pub. No.: WO2018/187715
PCT Pub. Date: Oct. 11, 2018

(65) Prior Publication Data
US 2021/0088035 A1 Mar. 25, 2021

Related U.S. Application Data

(60) Provisional application No. 62/482,583, filed on Apr. 6, 2017.

(51) Int. Cl.
*F04B 53/14* (2006.01)
*F04B 15/02* (2006.01)
(Continued)

(52) U.S. Cl.
CPC ............ *F04B 15/02* (2013.01); *F04B 53/147* (2013.01); *F04B 53/143* (2013.01); *F04B 53/16* (2013.01); *F16B 7/042* (2013.01)

(58) Field of Classification Search
CPC ............... F16D 1/0847; F16D 1/00–12; Y10T 403/5741; Y10T 403/55; F16B 7/0406;
(Continued)

(56) References Cited

U.S. PATENT DOCUMENTS 2,481,144 A * 9/1949 Neale ...................... F16D 51/20
192/75
3,969,033 A * 7/1976 Recker ................... B60K 17/28
403/322.2

(Continued)

FOREIGN PATENT DOCUMENTS

JP 3892094 B2 3/2007

OTHER PUBLICATIONS

International Search Report and Written Opinion dated Jul. 23, 2018, for Application No. PCT/US2018/026503.

*Primary Examiner* — Thomas Fink
(74) *Attorney, Agent, or Firm* — Conley Rose, P.C.

(57) ABSTRACT

A rod connector for coupling with a rod of a pump includes a cylinder including a bore, an actuator rotatably disposed in the bore of the cylinder, wherein the actuator is configured to actuate the rod connector between locked and unlocked positions, and a first coupler disposed in the bore of the cylinder and configured to releasably couple with a first rod of the pump, wherein the actuator includes an outer surface including a first pair of opposing engagement surfaces and a second pair of opposing engagement surfaces, and wherein a diameter extending between the first pair of engagement surfaces is less than a diameter extending between the second pair of surfaces.

21 Claims, 6 Drawing Sheets

(51) Int. Cl.
*F04B 53/16* (2006.01)
*F16B 7/04* (2006.01)

(58) Field of Classification Search
CPC ........ F16B 7/0413; F16B 7/042; F04B 39/00;
F04B 39/0022; F04B 39/14; F04B
39/0094; F04B 53/14; F04B 53/147;
F04B 53/144; F16J 7/00; F16J 1/12
See application file for complete search history.

(56) References Cited

U.S. PATENT DOCUMENTS

| | | | | |
|---|---|---|---|---|
| 5,613,484 | A * | 3/1997 | Troncoso | F41B 5/1426 |
| | | | | 403/325 |
| 5,904,071 | A * | 5/1999 | Kennedy | F04B 53/147 |
| | | | | 74/579 R |
| 6,164,188 | A * | 12/2000 | Miser | F04B 53/14 |
| | | | | 403/14 |
| 7,656,305 | B2 * | 2/2010 | Kennedy | F04B 49/065 |
| | | | | 702/42 |
| 10,036,384 | B1 * | 7/2018 | Jahnke | F16J 7/00 |
| 2003/0159823 | A1 | 8/2003 | Pichery et al. | |
| 2004/0261554 | A1 * | 12/2004 | Tylosky | F16B 7/06 |
| | | | | 74/89.39 |
| 2009/0081051 | A1 * | 3/2009 | Kennedy | F04B 49/065 |
| | | | | 417/63 |
| 2010/0275774 | A1 | 11/2010 | Clemens | |
| 2011/0138997 | A1 * | 6/2011 | Pacht | F04B 53/147 |
| | | | | 92/161 |
| 2011/0150596 | A1 | 6/2011 | Wolodko et al. | |
| 2020/0122313 | A1 * | 4/2020 | Takada | B25G 1/06 |

\* cited by examiner

ROD CONNECTOR AND METHOD

CROSS-REFERENCE TO RELATED APPLICATIONS

This application is a 35 U.S.C. § 371 national stage application of PCT/US2018/026503 filed Apr. 6, 2018, and entitled "Rod Connector and Method," which claims benefit of U.S. application No. 62/482,583 filed Apr. 6, 2017, both of which are incorporated herein by reference in their entirety for all purposes.

STATEMENT REGARDING FEDERALLY SPONSORED RESEARCH OR DEVELOPMENT

Not applicable.

BACKGROUND

Drilling systems are sometimes utilized for the extraction of hydrocarbons from a subterranean earthen formation via a drilling wellbore into the formation. Drilling systems include a mud pump configured to circulate drilling fluids through a drill string extending through a wellbore formed in a subterranean formation. In some applications, the mud pump comprises a reciprocating pump that includes a power end having a crankshaft, and a fluid end including a reciprocating piston, where the piston is coupled with the crankshaft by an extension rod extending therebetween. Due to wear during the operation of the mud pump, it may be necessary at times to replace the piston or other components coupled therewith. In some applications, the extension rod of the reciprocating mud pump includes a rod connector configured to allow the piston to be decoupled from the crankshaft and removed from the mud pump for repair or replacement.

BRIEF SUMMARY OF THE DISCLOSURE

An embodiment of a rod connector for coupling with a rod of a pump comprises a cylinder comprising a bore, an actuator rotatably disposed in the bore of the cylinder, wherein the actuator is configured to actuate the rod connector between locked and unlocked positions, and a first coupler disposed in the bore of the cylinder and configured to releasably couple with a first rod of the pump, wherein the actuator comprises an outer surface including a first pair of opposing engagement surfaces and a second pair of opposing engagement surfaces, and wherein a diameter extending between the first pair of engagement surfaces is less than a diameter extending between the second pair of surfaces. In some embodiments, the outer surface of the actuator further comprises a pair of cylindrical sections each in sealing engagement with the cylinder. In some embodiments, the actuator comprises a first angular position configured to lock the first coupler with the first rod, and a second angular position rotated from the first angular position and configured to unlock the first coupler from the first rod. In certain embodiments, the rod connector comprises an engagement member in contact with the outer surface of the actuator, wherein the engagement member is coupled to the first coupler, and a first biasing member disposed about the first coupler and in contact with a shoulder of the engagement member, wherein the first biasing member is configured to maintain contact between the engagement member and the outer surface of the actuator, wherein, when the actuator is in the first angular position, each of the first and second engagement surfaces of the actuator is spaced from the engagement member. In certain embodiments, when the actuator is in the first angular position, one of the second engagement surfaces of the actuator contacts the engagement member, and when the actuator is in the second angular position, one of the first engagement surfaces of the actuator contacts the engagement member. In some embodiments, the second angular position is spaced 90 degrees from the first angular position. In some embodiments, the actuator is in the first angular position and the first coupler is locked with the first rod, the first coupler is configured to apply a shear force to a coupling member in engagement with the first coupler and the first rod. In certain embodiments, when the actuator is in the first angular position and the first coupler is locked with the first rod, the actuator is configured to axially misalign a slot disposed in the first coupler with a slot disposed in the first shaft. In certain embodiments, each of the first pair of engagement surfaces and the second pair of engagement surfaces comprise planar surfaces.

An embodiment of a rod connector for coupling with a rod of a pump comprises a cylinder comprising a bore, an actuator rotatably disposed in the bore of the cylinder, and a first coupler disposed in the bore of the cylinder and configured to releasably couple with a first rod of the pump, wherein the actuator comprises a first angular position configured to lock the first coupler with the first rod, and a second angular position rotated from the first angular position and configured to unlock the first coupler from the first rod. In some embodiments, when the actuator is in the first angular position and the first coupler is locked with the first rod, the first coupler is configured to apply a shear force to a coupling member in engagement with the first coupler and the first rod. In some embodiments, the rod connector comprises a first biasing member disposed in the bore of the cylinder, wherein the first biasing member is configured to maintain engagement between the first coupler and the actuator. In some embodiments, when the actuator is in the first angular position and the first coupler is locked with the first rod, the first biasing member is configured to apply a tension force to the first coupler. In certain embodiments, the actuator is configured to be rotated between the first and second angular positions in response to the application of torque to the actuator. In certain embodiments, in response to actuation of the actuator between the first and second rotational positions, the actuator is configured to displace the first coupler axially in the bore of the cylinder. In some embodiments, the rod connector comprises a second coupler disposed in the bore of the cylinder and configured to releasably couple with a second rod of the pump, and a second biasing member disposed in the bore of the cylinder, wherein the second biasing member is configured to maintain engagement between the second coupler and the actuator, wherein the first coupler comprises a female coupler and the second coupler comprises a male coupler. In some embodiments, the actuator comprises an outer surface including a first pair of opposing planar surfaces and a second pair of opposing planar surfaces, and wherein a diameter extending between the first pair of planar surfaces is less than a diameter extending between the second pair of surfaces An embodiment of a method of coupling or decoupling a pair of rods of a pump, comprises extending a coupling member through a slot of a first coupler of a rod connector and a slot extending through a first rod of the pump, and rotating an actuator of the rod connector to apply a shear force to the coupling member and lock the first rod to the rod connector. In some embodiments, the method comprises axially displacing the coupling member in response to rotating the actuator of the rod connector. In some embodiments, rotating the actuator of the rod connector comprises applying a torque to the actuator.

BRIEF DESCRIPTION OF THE DRAWINGS

For a detailed description of exemplary embodiments, reference will now be made to the accompanying drawings in which:

FIG. 6 is a side cross-sectional view of the rod connector of FIG. 2 shown in a second position in accordance with principles disclosed herein.

DETAILED DESCRIPTION

Figure 1:
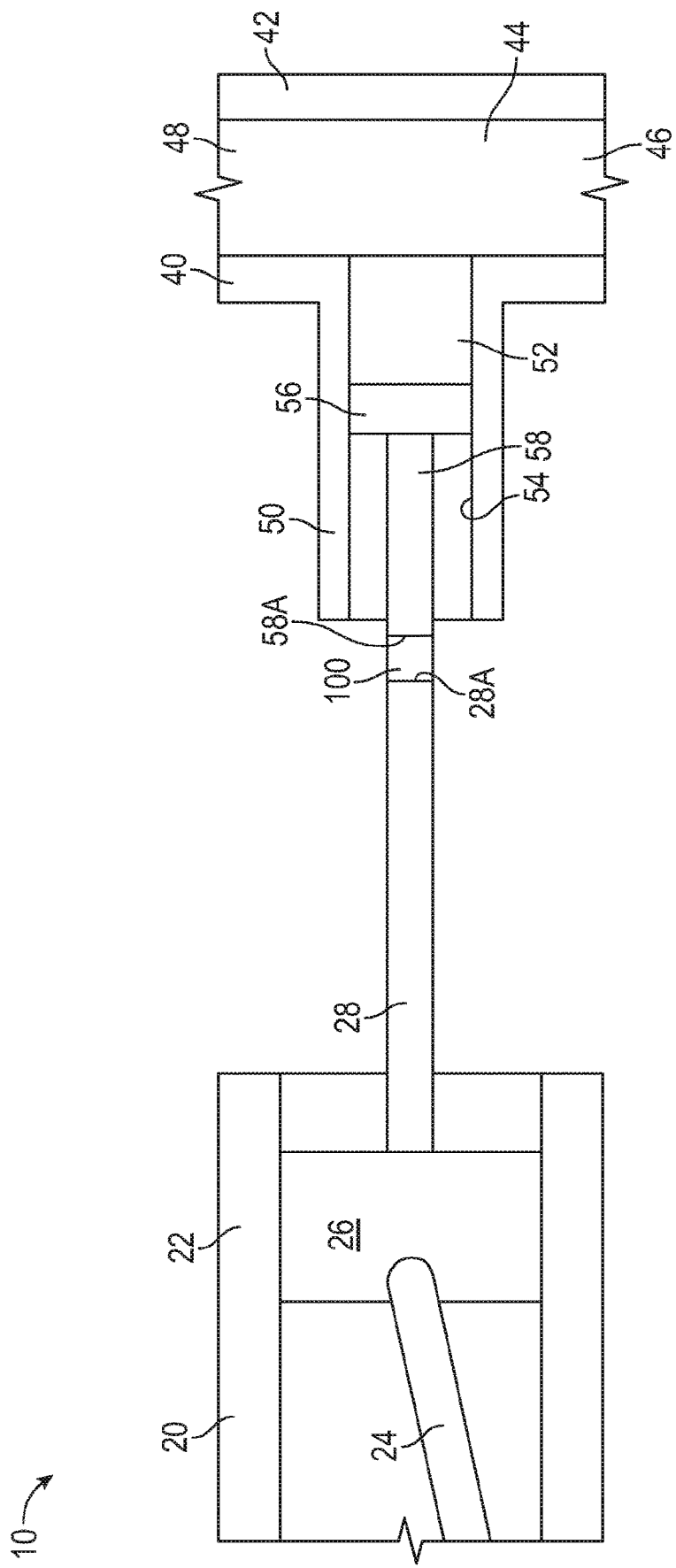
FIG. 1 is a schematic view of an embodiment of a mud pump system in accordance with principles disclosed herein.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring to FIG. 1, an embodiment of a mud pump system 10 is shown schematically in FIG. 1. Mud pump 10 is configured to pressurized and thereby circulate drilling fluids through a drill string (not shown) of a drilling system. In the embodiment shown in FIG. 1, mud pump 10 includes a power end 20 and a fluid end 40. Power end 20 generally includes a housing or cylinder 22, a connecting rod 24, a crosshead 26, and an extension rod 28. Connecting rod 24 is configured to receive rotational torque and motion from a crankshaft (not shown) of the power end 20, and in conjunction with crosshead 26, convert the rotational torque and motion received from the crankshaft into reciprocating force and motion that is applied to extension rod 28. Extension rod 28 is configured to transmit the reciprocating motion received from crosshead 26 to the dynamic components of the fluid end 40 of mud pump 10.

In the embodiment shown in FIG. 1, fluid end 40 of mud pump 10 generally includes a housing 42 coupled with a cylinder 50. Housing 42 includes a bore or passage 44 having an inlet 46 and an outlet 48. Housing 42 is configured to receive drilling fluids recirculated from the wellbore (not shown) of the drilling system, pressurize the recirculated fluids in passage 44, and circulate pressurized drilling fluids to the drill string of the drilling system via outlet 48. Although not shown in FIG. 1, inlet 46 and outlet 48 of passage 44 may each include one or more valves for controlling the flow of drilling fluids through passage 44 of housing 42. Cylinder 50 includes a central bore or passage 52 in fluid communication with passage 44 of housing 42, where passage 52 is defined by a generally cylindrical inner surface 54. In the embodiment shown in FIG. 1, inner surface 54 comprises a cylinder liner 54 coupled with cylinder 50.

In the embodiment shown in FIG. 1, fluid end 40 of mud pump 10 additionally includes a piston 56 slidably disposed in passage 52 of cylinder 50 and a piston rod 58 coupled with piston 56. An outer surface of piston 56 is in sealing engagement with cylinder liner 54 of cylinder 50 and is configured to pressurize drilling fluids disposed in the passage 44 of housing 42 via reciprocal motion of piston 56 within passage 52. In the embodiment shown in FIG. 1, piston rod 58 of fluid end 40 is coupled with extension rod 28 of power end 20 via a rod connector assembly 100. Particularly, rod connector 100 is releasably coupled to both a terminal end 28A of extension rod 28 and a terminal end 58A of piston rod 58. Rod connector 100 is configured to decouple from piston rod 58 to allow piston rod 58 and the piston 56 coupled thereto to be disassembled and removed from mud pump 10. For instance, during the operation of mud pump 10, it may be necessary to repair or replace piston 56 due to wear or damage occurring thereto. In this manner, rod connector 100 is configured to provide a rapid and convenient mechanism to decouple piston 56 from mud pump 10 such that piston 56 (or other dynamic components coupled therewith) may be repaired or replaced. Although rod connector 100 is shown as a component of mud pump 10, in other embodiments, rod connector 100 may be used in other pump systems, or in other mechanical systems that include the releasable coupling of tubular members.

Figure 2:
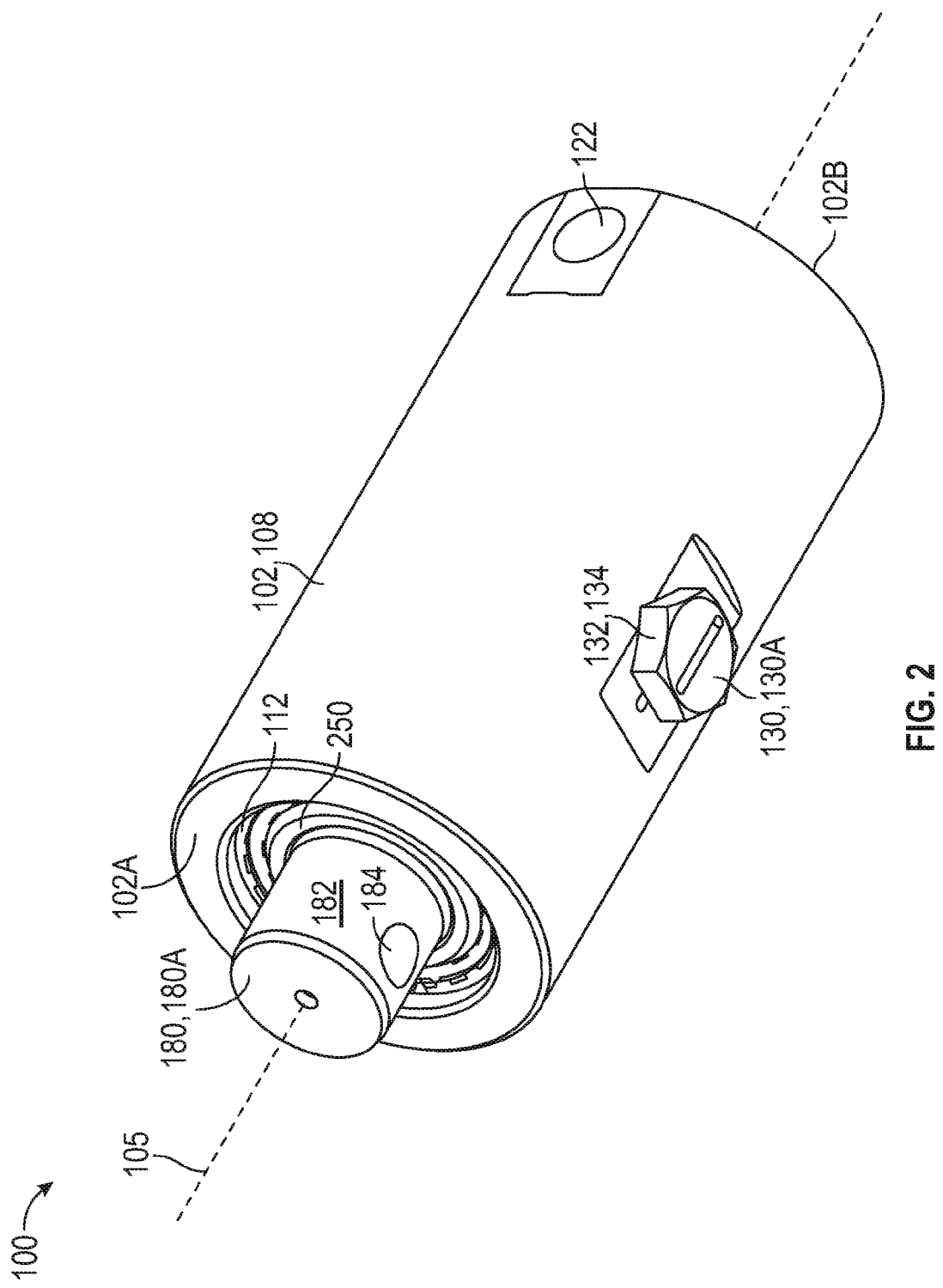
FIG. 2 is a perspective view of an embodiment of a rod connector of the mud pump system of FIG. 1 in accordance with principles disclosed herein.
Figure 3:
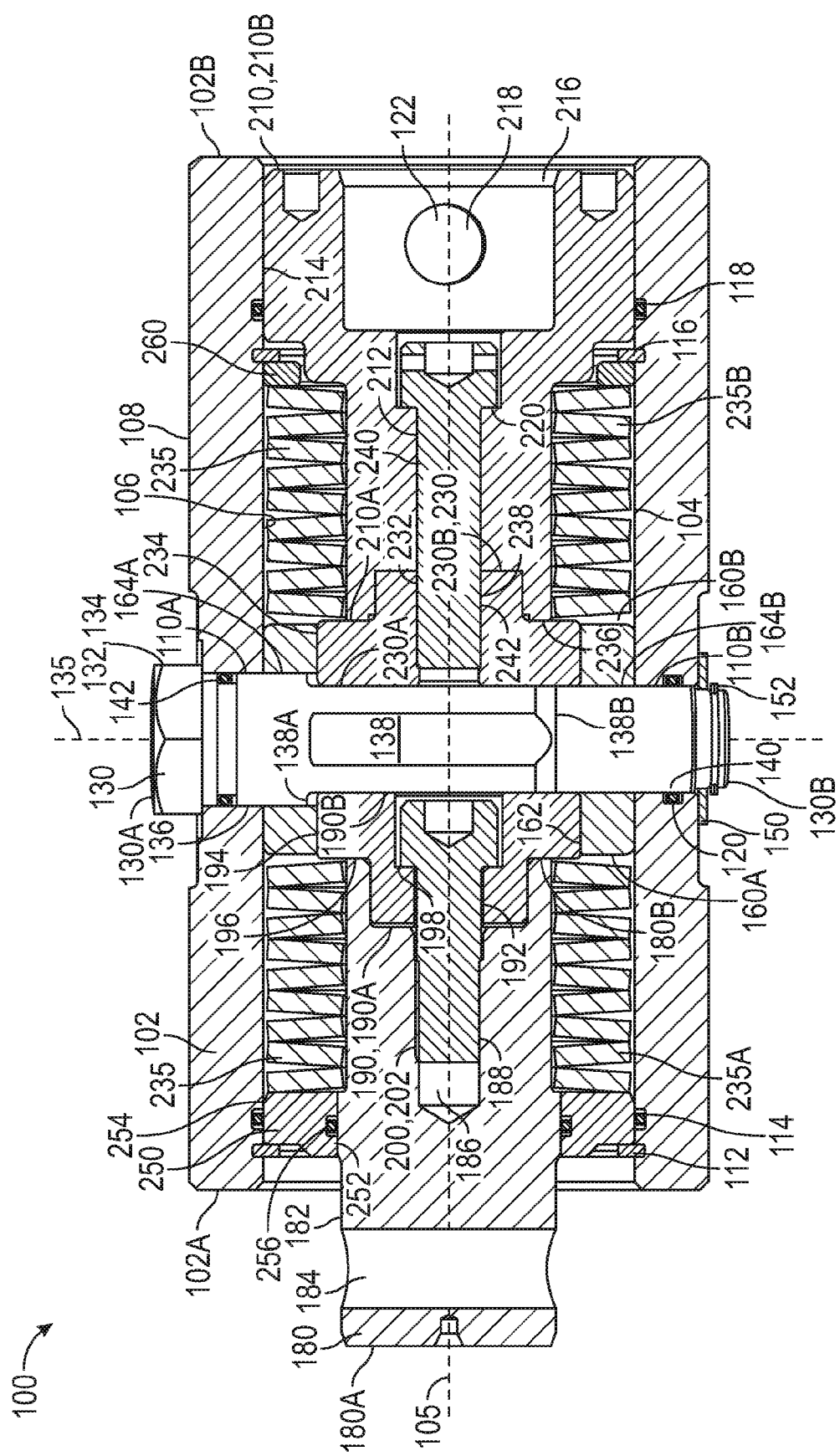
FIG. 3 is a side cross-sectional view of the rod connector of FIG. 2.
Figure 4:
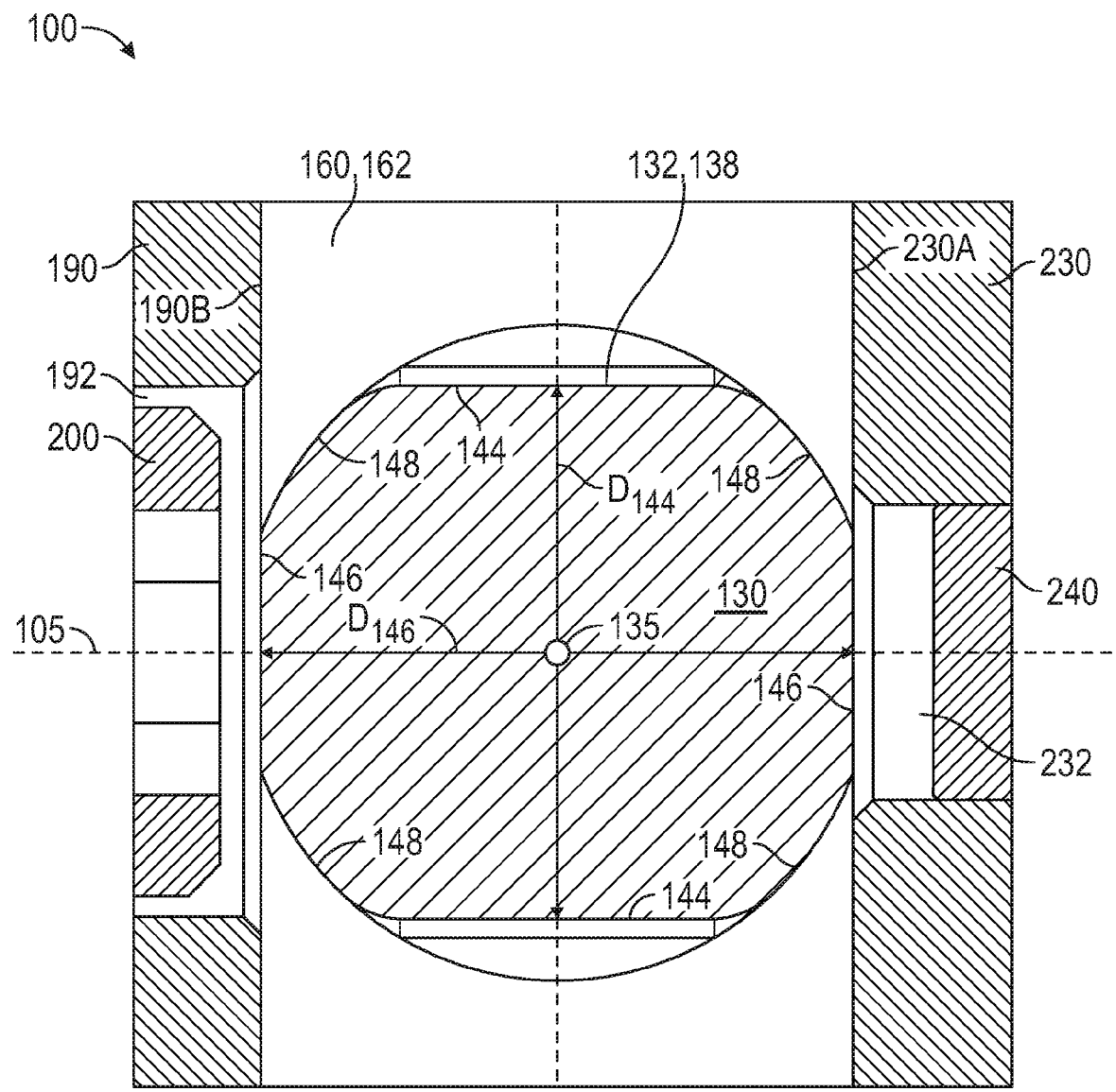
FIG. 4 is a zoomed-in top cross-sectional view of the rod connector of FIG. 2.

Referring to FIGS. 2-4, an embodiment of rod connector 100 of mud pump 10 is shown. In the embodiment shown in FIGS. 2-4, rod connector 100 has a central or longitudinal axis 105 and generally includes an outer housing or cylinder 102, an actuator 130, a central sleeve 160, a male coupler 180, a female coupler 210, and a plurality of biasing members 235. In some embodiments, female coupler 210 comprises a first coupler 210 while male coupler 180 comprises a second coupler 180. Cylinder 102 is generally cylindrical and includes a first end 102A, a second end 102B, a central bore or passage 104 defined by a generally cylindrical inner surface 106 extending between ends 102A and 102B, and a generally cylindrical outer surface 108 extending between ends 102A and 102B. Additionally, cylinder 102 includes a first or upper aperture 110A and a second or lower aperture 110B circumferentially spaced approximately 180° from upper aperture 110A. Apertures 110A and 110B each extend radially between inner surface 106 and outer surface 108 of cylinder 102 to thereby allow actuator 130 to be radially received in passage 104 of cylinder 102.

In the embodiment shown in FIGS. 2-4, the inner surface 106 of cylinder 102 includes (moving axially from first end 102A towards second end 102B) a first retainer ring 112, a first annular seal 114, a second retainer ring 116, and a second annular seal 118. In the embodiment shown in FIGS. 2-4, annular seals 114 and 118 comprise Nitrite O-ring seals; however, in other embodiments, annular seals 114 and 118 may comprise other annular seals known in the art. In the embodiment shown in FIGS. 2-4, cylinder 102 additionally includes a third or actuator annular seal 120 disposed in an inner surface of lower aperture 110B. Additionally, cylinder 102 includes a pair of radial slots 122 located axially proximal second end 102B, where each slot 122 extends radially between inner surface 106 and outer surface 108. In the embodiment shown in FIGS. 2-4, slots 122 are circumferentially spaced approximately 180° apart.

As will be discussed further herein, actuator 130 of rod connector 100 is configured to actuate connector 100 between a first or unlocked position and a second or locked position. In the embodiment shown in FIGS. 2-4, actuator 130 has a central or longitudinal axis 135 (orthogonal central axis 105) and comprises an elongate, cylindrical member or rod including a first or upper end 130A, a second or lower end 130B, and an outer surface 132 extending between ends 130A and 130B. Outer surface 132 of actuator 130 includes an engagement interface 134, a first or upper cylindrical section 136, an actuator section 138, and a second or lower cylindrical section 140.

Engagement interface 134 of the outer surface 132 of actuator 130 is configured to releasably couple with a tool (not shown) from which rotational torque may be transferred to actuator 130 to rotate actuator 130 about central axis 135. In the embodiment shown in FIGS. 2-4, engagement interface 134 is hexagonal and configured to rotationally lock with a hexagonal wrench; however, in other embodiments, engagement interface 134 may comprise various shapes configured to provide for the transmission of torque to actuator 130. In the embodiment shown in FIGS. 2-4, upper cylindrical section 136 of outer surface 132 includes an annular seal 142 disposed therein that sealingly engages an inner surface of upper aperture 110A. In the embodiment shown in FIGS. 2-4, annular seal 142 comprises a Nitrite O-ring seal; however, in other embodiments, annular seal 142 may comprise another annular seal known in the art.

In the embodiment shown in FIGS. 2-4, actuator section 138 of outer surface 132 has a first or upper end or shoulder 138A and a second or lower end or shoulder 138B, where upper cylindrical section 136 extends to, and terminates at, upper end 138A, and lower cylindrical section 140 extends to, and terminates at, lower end 138B.

As shown particularly in FIG. 4, actuator section 138 of outer surface 132 has a rounded rectangular cross-section including a first pair of opposing first engagement surfaces 144, a second pair of opposed second engagement surfaces 146, and a plurality of curved surfaces 148, each extending circumferentially between one first engagement surface 144 and one second engagement surface 146. Actuator section 138 has a first or minor diameter $D_{144}$ extending between the pair of first engagement surfaces and a second or major diameter $D_{146}$ extending between the second pair of surfaces 146, where second diameter $D_{146}$ is greater than first diameter $D_{144}$. In this embodiment, the first pair of engagement surfaces 144 and the second pair of engagement surfaces 146 each comprise planar surfaces; however, in other embodiments, surfaces 144 and 146 may comprise different surface shapes or geometries.

In this embodiment, the axial width of actuator section 138 (i.e., the width of section 138 extending along the central axis 105 of connector 100) varies depending upon the rotational position of actuator 130 in cylinder 102. As will be discussed further herein, actuator 130 includes a first or unlocked position where second engagement surfaces 146 intersect central axis 105 (with the first engagement surfaces 144 not intersecting central axis 105), and a second or locked position where first engagement surfaces 144 intersect central axis 105 (with the second engagement surfaces 146 not intersecting central axis 105). The unlocked and locked positions of actuator 130 correspond with the unlocked and locked positions, respectively, of rod connector 100 discussed above. When actuator 130 is disposed in the unlocked position, the actuator section 138 of actuator 130 has a greater axial width than the actuator section 138 when actuator 130 is disposed in the locked position.

In addition, the locked position of actuator 130 corresponds to an operating position of rod connector 100 while the unlocked position of actuator 130 corresponds to a maintenance position of rod connector 100. Particularly, when rod connector 100 is in the operating position, mud pump 10 may be operated to circulate drilling fluids through a drill string of a drilling system with rod connector 100 locking the extension rod 28 of mud pump 10 with piston rod 58. Conversely, when rod connector is in the maintenance position, extension rod 28 of mud pump 10 is unlocked from piston rod 58 to allow for maintenance to be performed on mud pump 10.

In the embodiment shown in FIGS. 2-4, the second lower cylindrical section 140 of the outer surface 132 of actuator 130 is sealingly engaged by actuator seal 120, restricting fluid communication therebetween. Additionally, an annular member or washer 150 is disposed about the lower end 130B of actuator 130 and a retainer ring 152 is coupled to lower cylindrical section 140 proximal lower end 130B to restrict relative radial movement between actuator 130 and cylinder 102. Specifically, following the insertion of central sleeve 160 into bore 104 of cylinder 102, the lower end 130B of actuator 130 may be inserted into cylinder 102 via upper aperture 110A until lower end 130B extends from cylinder 102 via lower aperture 110B. In this position, washer 150 may be placed over lower end 130B, and then retainer ring 152 may be coupled to lower end 130B to lock or couple actuator 130 with cylinder 102. In this arrangement, while relative radial and axial movement between actuator 130 and cylinder 102 is restricted, actuator 130 is still free to rotate about central axis 135, as will be discussed further herein.

Central sleeve 160 of rod connector 100 is configured to receive and support actuator 130. In the embodiment shown in FIGS. 2-4, central sleeve 160 is generally cylindrical and has a first end 160A, a second end 160B, and a central bore or passage 162 extending between ends 160A and 160B. Additionally, central sleeve 160 includes a first or upper aperture 164A and a second or lower aperture 164B circumferentially spaced approximately 180° from upper aperture 164A. Apertures 164A and 164B each extend radially between an inner surface defining bore 162 and an outer surface of central sleeve 160 to allow actuator 130 to be radially received in passage 104 of cylinder 102.

Male coupler 180 of rod connector 100 is configured to releasably couple with the terminal end 28A of extension rod 28 shown in FIG. 1. In the embodiment shown in FIGS. 2-4, male coupler 180 is generally cylindrical and includes a first end 180A, a second end 180B, and a generally cylindrical outer surface 182 extending between ends 180A and 180B. Male coupler 180 includes a radial slot 184 proximal first end 180A that extends radially entirely through coupler 180. Additionally, male coupler 180 includes a bore or receptacle 186 extending axially into coupler 180 from second end 180B, where at least a portion of an inner surface of receptacle 186 includes a releasable or threaded connector 188 formed thereon.

In the embodiment shown in FIGS. 2-4, rod connector 100 includes a first engagement member 190 releasably coupled with male coupler 180. Particularly, first engagement member 190 is generally cylindrical and includes a first end 190A, a second end 190B, a central bore or passage 192 extending between ends 190A and 190B, and an outer surface 194 extending between ends 190A and 190B. In this arrangement, second end 190B of first engagement member 190 is received in the bore 162 of central sleeve 160 at the first end 160A thereof and forms an annular engagement surface 190B for physically engaging the actuator section 138 of actuator 130, as will be discussed further herein. First engagement member 190 is partially received in the receptacle 186 of male coupler 180 and outer surface 194 includes an annular shoulder 196 that contacts or is disposed directly adjacent second end 180B of male coupler 180 when first engagement member 190 is coupled with male coupler 180. Particularly, a first releasable connector 200 extends through the bore 192 of first engagement member 190 and into the bore 186 of male coupler 180. First connector 200 includes a releasable or threaded connector 202 disposed on an outer surface thereof to threadably couple with the releasable connector 188 of male coupler 180, thereby securing or coupling first engagement member 190 to male coupler 180. Specifically, engagement between first connector 200 and an annular shoulder 198 formed in an inner surface that defines bore 192 of member 190 axially locks first engagement member 190 with male coupler 180. Although in the embodiment of FIGS. 2-4 first engagement member 190 and male coupler 180 comprise separate, distinct components releasably coupled via first connector 200, in other embodiments, first engagement member 190 and male coupler 180 may comprise a single, unitary or monolithic component.

Female coupler 210 of rod connector 100 is configured to releasably couple with the terminal end 58A of piston rod 58 shown in FIG. 1. In the embodiment shown in FIGS. 2-4, female coupler 210 is generally cylindrical and includes a first end 21A, a second end 210B, a central bore or passage 212 extending between ends 210A and 210B, and a generally cylindrical outer surface 214 extending between ends 210A and 210B. Outer surface 214 of female coupler 210 is sealingly engaged by second seal 118 of cylinder 102 to restrict fluid communication therebetween. Bore 212 of female coupler 210 includes a receptacle 216 extending from second end 210B of female coupler 210 and configured to receive the terminal end 58A of piston rod 58. Receptacle 216 of bore 212 includes a radial slot 218 that extends radially entirely through female coupler 210. Slot 218 of female coupler 210 is angularly aligned with slots 122 of cylinder 102. In some embodiments, relative rotation between female coupler 210 and cylinder 102 is restricted to maintain angular alignment between slot 218 of coupler 210 and slots 122 of cylinder 102.

In the embodiment shown in FIGS. 2-4, rod connector 100 includes a second engagement member 230 releasably coupled with female coupler 210. Particularly, second engagement member 230 is generally cylindrical and includes a first end 230A, a second end 230B, a central bore or passage 232 extending between ends 230A and 230B, and an outer surface 234 extending between ends 230A and 230B. In this arrangement, first end 230A of second engagement member 230 is received in the bore 162 of central sleeve 160 at the second end 160B thereof and forms an annular engagement surface 230A for physically engaging the actuator section 138 of actuator 130, as will be discussed further herein.

In the embodiment shown in FIGS. 2-4, second engagement member 230 is partially received in the bore 212 of female coupler 210 and outer surface 234 includes an annular shoulder 236 that contacts or is disposed directly adjacent first end 210A of female coupler 210 when second engagement member 230 is coupled with female coupler 210. Particularly, a second releasable connector 240 extends through the bore 212 of female coupler 210 and into the bore 232 of second engagement member 230. Second connector 240 includes a releasable or threaded connector 242 disposed on an outer surface thereof to threadably couple with a releasable or threaded connector 238 formed on an inner surface of the bore 232 of second engagement member 230, thereby securing or coupling female coupler 210 with second engagement member 230. Specifically, engagement between second connector 240 and an annular shoulder 220 formed in an inner surface of the bore 212 of female coupler 210 axially locks coupler 210 with second engagement member 230. Although in the embodiment of FIGS. 2-4 second engagement member 230 and female coupler 210 comprise separate, distinct components releasably coupled via second connector 240, in other embodiments, second engagement member 230 and female coupler 210 may comprise a single, unitary or monolithic component.

In the embodiment shown in FIGS. 2-4, rod connector 100 additionally includes a first annular biasing member or spring retainer 250 and a second annular biasing member or spring retainer 260. First spring retainer 250 has a central bore or passage defined by a generally cylindrical inner surface 252, and a generally cylindrical outer surface 254. First spring retainer 250 is positioned axially within bore 104 of cylinder 102 between first retainer ring 112 and a first plurality of biasing members 235A. Particularly, the first plurality of biasing members 235A are axially positioned between first spring retainer 250 and the shoulder 196 of first engagement member 190. Inner surface 252 of first spring retainer 250 includes an annular seal 256 disposed therein that sealingly engages the outer surface 182 of male coupler 180 to restrict fluid communication therebetween. Additionally, the outer surface 254 of first spring retainer 250 is sealingly engaged by first seal 114 to restrict fluid communication therebetween.

In the configuration shown in FIGS. 2-4, the first plurality of biasing members 235A provides an axial biasing force against first spring retainer 250 in the direction of first retainer ring 112 and against first engagement member 190 (via engagement with shoulder 196) in the direction of actuator 130. In some embodiments, the first plurality of biasing members 235A may be configured to maintain contact or engagement between the second end 190B of first engagement member 190 and the actuator section 138 of the outer surface 132 of actuator 130. Additionally, the sealing engagement provided by seals 114, 118, 120, 142, and 256 act to seal or restrict fluid communication between bore 104 of cylinder 102 and the surrounding environment.

In the embodiment shown in FIGS. 2-4, second spring retainer 260 is positioned axially within bore 104 of cylinder 102 between second retainer ring 116 and a second plurality of biasing members 235A. Particularly, the second plurality of biasing members 235B are axially positioned between second spring retainer 260 and the shoulder 236 of second engagement member 230. In the configuration shown in FIGS. 2-4, the second plurality of biasing members 235B provides an axial biasing force against second spring retainer 260 in the direction of second retainer ring 116, and against second engagement member 230 (via engagement with shoulder 236) in the direction of actuator 130. In some embodiments, the second plurality of biasing members 235B may be configured to maintain contact or engagement between the first end 230A of second engagement member 230 and the actuator section 138 of the outer surface 132 of actuator 130.

Figure 5:
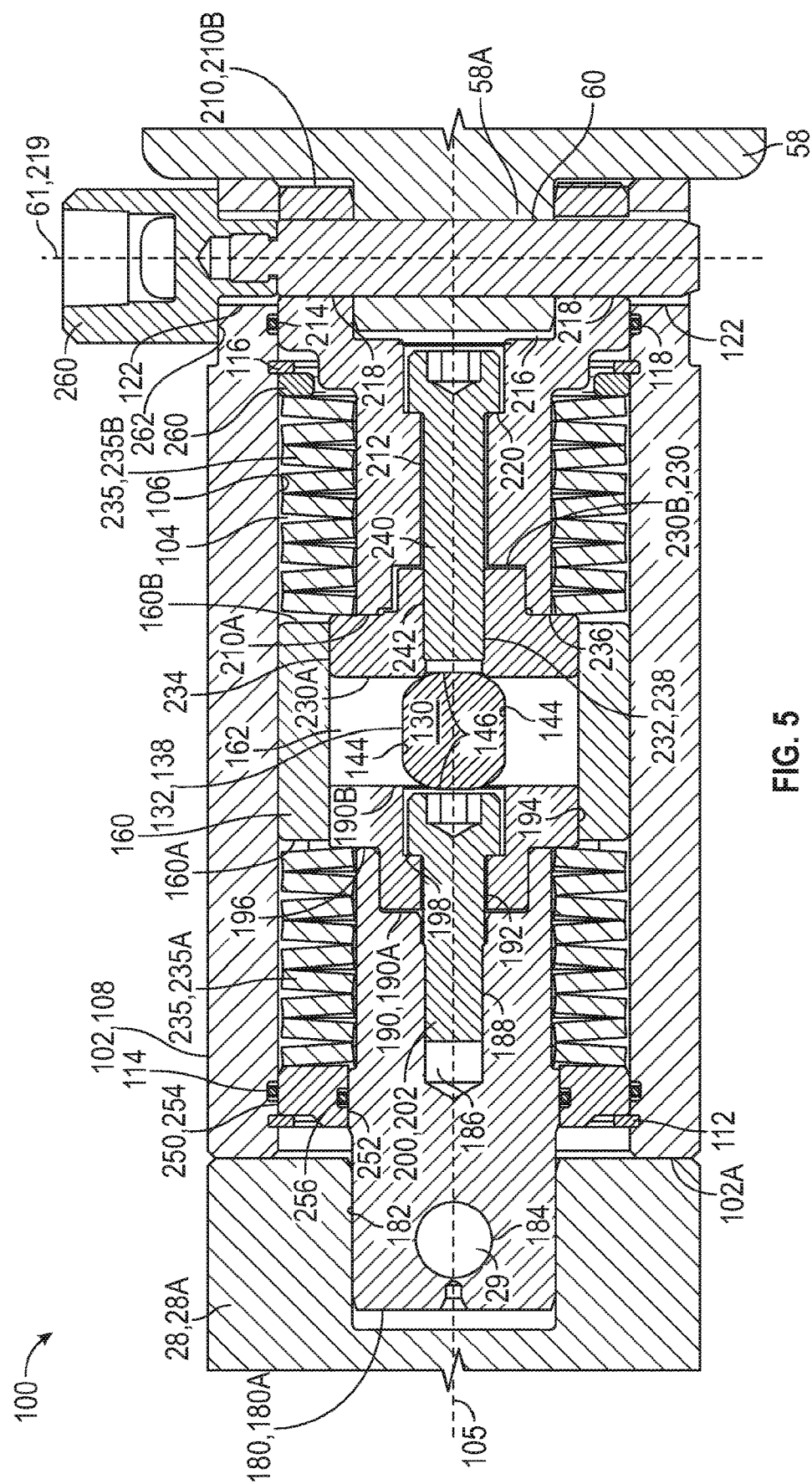
FIG. 5 is a side cross-sectional view of the rod connector of FIG. 2 shown in a first position in accordance with principles disclosed herein.
Figure 6:
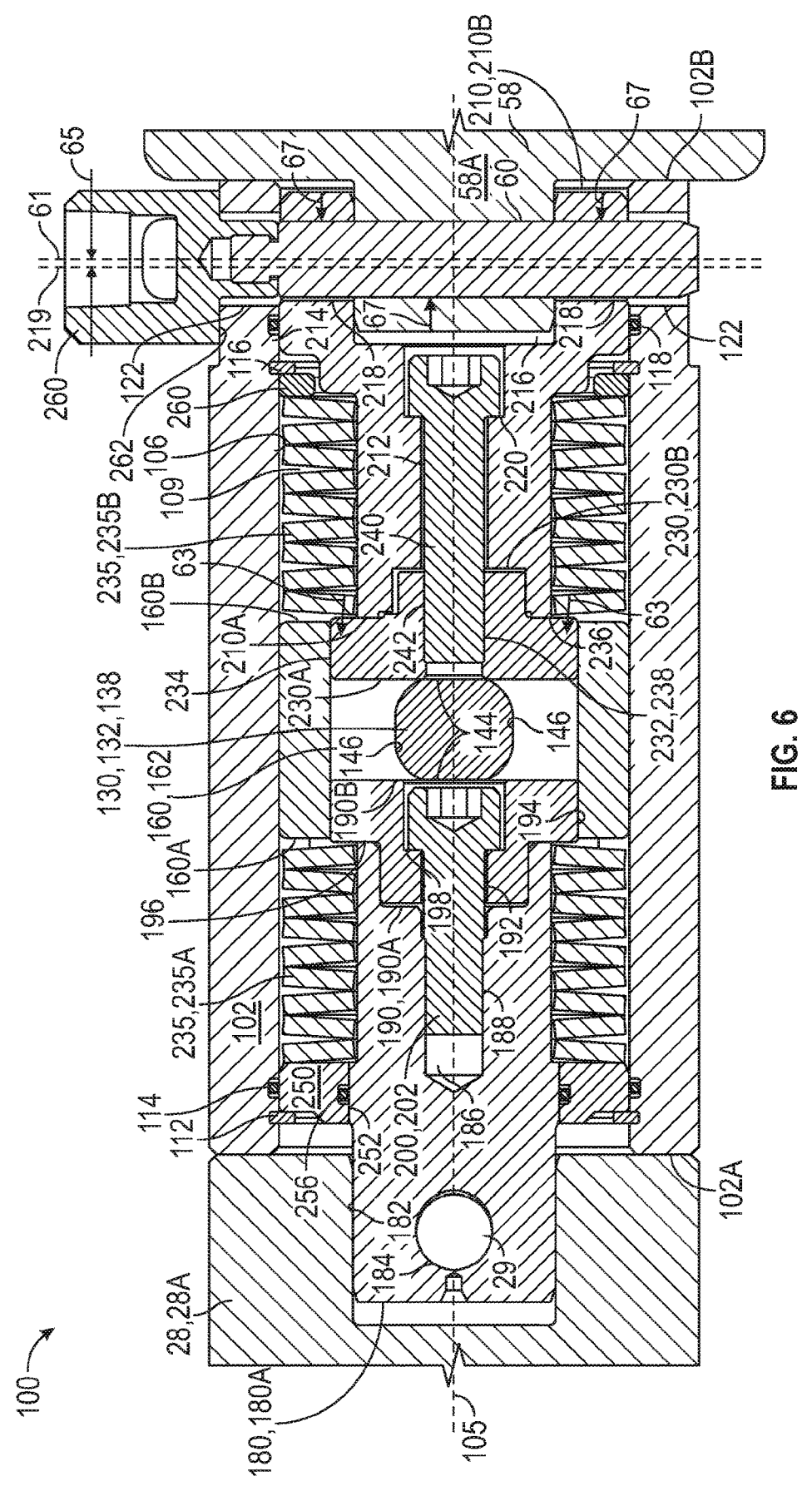

Referring to FIGS. 4-6, FIG. 5 illustrates rod connector 100 and actuator 130 in the unlocked position while FIG. 6 illustrates rod connector 100 and actuator 130 in the locked position. For clarity, the side cross-section of rod connector 100 shown in FIGS. 5 and 6 is rotated 90° from the side cross-section shown in FIG. 3. In the unlocked position shown in FIG. 5, the second end 190B of first engagement member 190 and the first end 230A of second engagement member 230 are physically engaged by second engagement surfaces 146 of actuator 130, thereby compressing the first and second pluralities of biasing members 235A and 235B, respectively. In this position, a central or longitudinal axis 219 of slots 218 of female coupler 210 is axially aligned with a central or longitudinal axis 61 of a radial slot 60 extending through the terminal end 58A of piston rod 58. Given the axial alignment of slots 218 of female coupler 210 and slot 60 of piston rod 58, an elongate coupling member or retainer pin 260 may be radially inserted through slots 122 of cylinder 102, slots 218 of female coupler 210, and slot 60 of piston rod 58, as shown in FIG. 5. Engagement between a shoulder 262 of retainer pin 260 and the outer surface 108 cylinder 102 retains pin 260 in the unlocked position shown in FIG. 5 with pin 260 extending through slot 60 of piston rod 58. Additionally, the compression of the second plurality of biasing members 235B by actuator 130 prevents biasing members 235B from applying a biasing force against pin 260.

Following the insertion of retainer pin 260 in slot 60 of piston rod 58, piston rod 58 may be locked to extension rod 28 (rod 28 being coupled to rod connector 100 via an elongate coupling member or retainer pin 29) by actuating rod connector 100 and actuator 130 from the unlocked position shown in FIG. 5 to the locked position shown in FIG. 6. Specifically, a torque application member, such as a wrench, may engage the engagement surface 134 of actuator 130. Following engagement with engagement surface 134, torque may be applied to actuator 130 via the torque application member to rotate actuator 130 approximately 90° about central axis 135 in a first rotational direction. The rotation of actuator 130 approximately 90° in the first rotational direction actuates the actuator 130, and in-turn rod connector 100, from the unlocked position shown in FIG. 5 to the locked position shown in FIG. 6. Although in the embodiment of FIGS. 4-6 actuator 130 is actuated between the unlocked and locked positions via rotating actuator 130 by approximately 90°, in other embodiments, actuator 130 may be actuated between the unlocked and locked positions by rotating actuator approximately 45°, 130°, 180°, etc. The ability to actuate the actuator 130 and rod connector 100 between the unlocked and locked positions in response to applying torque to actuator 130 allows connector 100 to be actuated without the assistance of additional, external actuation systems such as hydraulic or pneumatic pumping systems, electrical actuators, etc. In other words, rod connector 100 and actuator 130 may be actuated between the unlocked and locked positions through the convenient application of a torque application member, such as a hand-operated wrench that does not require an external power source.

In the locked position of rod connector 100 and actuator 130 shown in FIG. 6, the second end 190B of first engagement member 190 and the first end 230A of second engagement member 230 are disposed adjacent first engagement surfaces 144 of actuator 130. Given that the diameter $D_{144}$ between first engagement surfaces 144 is less than the diameter $D_{146}$ between second engagement surfaces 146, engagement by first engagement surfaces 144 of actuator 130 allows the first and second pluralities of biasing members 235A and 235B to act against shoulders 196 and 236 of first and second engagement members 190 and 230, respectively, and thereby place male coupler 180 and female coupler 210 in tension via a tension force 63 (shown in FIG. 6). In this arrangement, the second plurality of biasing members 235B applies a biasing force against pin 260. With female coupler 210 placed in tension by the biasing force applied to second engagement member 230 via the second plurality of biasing members 235B, the central axis 219 of slots 218 of female coupler 210 becomes axially offset or misaligned with the central axis 61 of the slot 60 of piston rod 58, forming an axial gap or offset 65 (shown in FIG. 6).

With female coupler 210 placed in tension and the formation of axial offset 65, a shear force 67 is applied to retainer pin 260 by both female coupler 210 and piston rod 58. With pin 260 placed in shear by shear force 67, pin 260 becomes locked to both female coupler 210 and piston rod 58, and thus, is restricted from becoming decoupled from either rod connector 100 and piston rod 58. This locking engagement of pin 260 thereby locks piston rod 58 with rod connector 100, and in-turn, with the extension rod 28 coupled with rod connector 100. In this embodiment, the first engagement surfaces 144 of actuator 130 are spaced from the second end 190B of first engagement member 190 and the first end 230A of second engagement member 230 when actuator 130 is in the locked position such that actuator 130 does not contact either first engagement member 190 or second engagement member 230. However, in other embodiments, first engagement surfaces 144 of actuator 130 may contact the second end 190B of first engagement member 190 and the first end 230A of second engagement member 230 when actuator 130 is in the locked position.

With rod connector 100 and actuator 130 disposed in the locked position shown in FIG. 6, actuator 130 and connector 100 may be actuated back into the unlocked position shown in FIG. 5 by rotating actuator 130 (via the torque application member) approximately 90° about central axis 135. With rod connector 100 and actuator 130 returned to the unlocked position shown in FIG. 5, retainer pin 260, which is no longer placed in shear by shear force 67, may be radially removed from slot 60 of piston rod 58, thereby decoupling piston rod 58 from rod connector 100, and in-turn, the extension rod 28 coupled thereto. Additional rotation of actuator 130 will alternatingly position actuator 130 in the locked and unlocked positions as first engagement surfaces 144 and second engagement surfaces 146 enter into and out of alignment with the second end 190B of first engagement member 190 and the first end 230A of second engagement member 230. Thus, actuator 130 is configured such that the application of inadvertently excessive torque or rotation thereto will not damage actuator 130 or other components of rod connector 100 given that actuator 130 is permitted to freely rotate in cylinder 102, improving the safety and reliability of rod connector 100.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A rod connector for coupling with at least a first rod of a pump, comprising:
    a cylinder comprising a central bore;
    an actuator rotatably disposed and extending orthogonally through the central bore of the cylinder, wherein the actuator is configured to actuate the rod connector between locked and unlocked positions; and
    a first coupler disposed in the central bore of the cylinder and configured to releasably couple with the first rod of the pump;
    wherein the actuator comprises an outer surface including a first pair of opposing planar engagement surfaces and a second pair of opposing planar engagement surfaces circumferentially spaced from the first pair of opposing planar engagement surfaces, and wherein a diameter extending between the first pair of opposing planar engagement surfaces is less than a diameter extending between the second pair of opposing planar engagement surfaces.

2. The rod connector of claim 1, wherein the outer surface of the actuator further comprises a pair of cylindrical sections flanking the first pair of opposing planar engagement surfaces and the second pair of opposing planar engagement surfaces and with each of the pair of cylindrical sections in sealing engagement with the cylinder.

3. The rod connector of claim 1, wherein the locked position of the actuator comprises a first angular position configured to lock the first coupler with the first rod, and the unlocked position of the actuator comprises a second angular position rotated from the first angular position and configured to unlock the first coupler from the first rod.

4. The rod connector of claim 3, further comprising:
    an engagement member in contact with the outer surface of the actuator, wherein the engagement member is coupled to the first coupler; and
    a first biasing member disposed about the first coupler and in contact with a shoulder of the engagement member;
    wherein the first biasing member is configured to maintain contact between the engagement member and the outer surface of the actuator;
    wherein, when the actuator is in the first angular position, each of the second pair of opposing planar engagement surfaces of the actuator is spaced from the engagement member.

5. The rod connector of claim 3, wherein:
    when the actuator is in the first angular position, one of the first pair of opposing planar engagement surfaces of the actuator contacts the engagement member; and
    when the actuator is in the second angular position, one of the second pair of opposing planar engagement surfaces of the actuator contacts the engagement member.

6. The rod connector of claim 3, wherein the second angular position is spaced 90 degrees from the first angular position.

7. The rod connector of claim 3, wherein, when the actuator is in the first angular position and the first coupler is locked with the first rod, the first coupler is configured to apply a shear force to a coupling member in engagement with the first coupler and the first rod.

8. The rod connector of claim 3, wherein, when the actuator is in the first angular position and the first coupler is locked with the first rod, the actuator is configured to axially misalign a slot disposed in the first coupler with a slot disposed in the first rod.

9. A rod connector for coupling with at least a first rod of a pump, comprising:
    a cylinder comprising a bore;
    an actuator rotatably disposed in the bore of the cylinder;
    a central cylindrical sleeve extending centrally within the bore of the cylinder and orthogonally to the actuator, wherein the central cylindrical sleeve comprises a central passage through which the actuator extends; and
    a first coupler disposed in the bore of the cylinder and configured to releasably couple with the first rod of the pump;
    wherein the actuator comprises a first angular position configured to lock the first coupler with the first rod, and a second angular position rotated from the first angular position and configured to unlock the first coupler from the first rod.

10. The rod connector of claim 9, wherein, when the actuator is in the first angular position and the first coupler is locked with the first rod, the first coupler is configured to apply a shear force to a coupling member in engagement with the first coupler and the first rod.

11. The rod connector of claim 9, further comprising a first biasing member disposed in the bore of the cylinder, wherein the first biasing member is configured to maintain engagement between the first coupler and the actuator.

12. The rod connector of claim 11, wherein, when the actuator is in the first angular position and the first coupler is locked with the first rod, the first biasing member is configured to apply a tension force to the first coupler.

13. The rod connector of claim 9, wherein the actuator is configured to be rotated between the first and second angular positions in response to an application of torque to the actuator.

14. The rod connector of claim 9, wherein, in response to actuation of the actuator between the first and second angular positions, the actuator is configured to displace the first coupler axially in the bore of the cylinder.

15. The rod connector of claim 9, further comprising:
    a second coupler disposed in the bore of the cylinder and configured to releasably couple with a second rod of the pump; and
    a second biasing member disposed in the bore of the cylinder, wherein the second biasing member is configured to maintain engagement between the second coupler and the actuator;
    wherein the first coupler comprises a female coupler and the second coupler comprises a male coupler.

16. The rod connector of claim 9, wherein the actuator comprises an outer surface including a first pair of opposing planar surfaces and a second pair of opposing planar surfaces, and wherein a diameter extending between the first pair of planar surfaces is less than a diameter extending between the second pair of surfaces.

17. A method of coupling or decoupling a pair of rods of a pump, comprising:

extending a coupling member through a slot of a first coupler of a rod connector and a slot extending through a first rod of the pair of rods of the pump; and rotating an actuator of the rod connector whereby a first pair of opposing planar engagement surfaces of the actuator exit out of engagement with a pair of opposed engagement members of the rod connector and a second pair of opposing planar engagement surfaces of the actuator enter into engagement with the pair of opposed engagement members to apply a shear force to the coupling member and lock the first rod to the rod connector, wherein a diameter extending between the first pair of engagement surfaces is less than a diameter extending between the second pair of surfaces.

18. The method of claim 17, further comprising axially displacing the coupling member in response to rotating the actuator of the rod connector.

19. The method of claim 17, wherein rotating the actuator of the rod connector comprises applying a torque to the actuator.

20. The rod connector of claim 1, wherein:

the outer surface of the actuator comprises a first cylindrical section which terminates at a first shoulder formed at an interface between the first cylindrical section and at least one of the first pair of planar engagement surfaces and the second pair of planar engagement surfaces; and the outer surface of the actuator comprises a second cylindrical section, spaced from the first cylindrical section, and which terminates at a second shoulder formed at an interface between the second cylindrical section and at least one of the first pair of planar engagement surfaces and the second pair of planar engagement surfaces whereby the first pair of planar engagement surfaces and the second pair of planar engagement surfaces are located along the outer surface of the actuator between the first cylindrical section and the second cylindrical section.

21. The rod connector of claim 9, wherein the central passage of the central cylindrical sleeve is defined at least in part by a pair of circumferentially spaced apertures located between longitudinally opposed ends of the central cylindrical sleeve, and wherein the actuator is received in each of the pair of circumferentially spaced apertures.

* * * * *